Oct. 24, 1961  C W. MUSSER  3,005,358
IRREVERSIBLE HIGH EFFICIENCY TRANSMISSION
Filed May 16, 1960  3 Sheets-Sheet 1

Inventor
C Walton Musser
By his Attorney

Oct. 24, 1961 C W. MUSSER 3,005,358
IRREVERSIBLE HIGH EFFICIENCY TRANSMISSION
Filed May 16, 1960 3 Sheets-Sheet 2

Oct. 24, 1961 C W. MUSSER 3,005,358
IRREVERSIBLE HIGH EFFICIENCY TRANSMISSION
Filed May 16, 1960 3 Sheets-Sheet 3

United States Patent Office 3,005,358
Patented Oct. 24, 1961

3,005,358
IRREVERSIBLE HIGH EFFICIENCY
TRANSMISSION
C Walton Musser, Beverly, Mass., assignor to United Shoe Machinery Corporation, Flemington, N.J., a corporation of New Jersey
Filed May 16, 1960, Ser. No. 29,407
7 Claims. (Cl. 74—640)

The present invention relates to an irreversible high efficiency transmission.

The purpose of the invention is to render a transmission of high efficiency irreversible.

A further purpose is to protect against failure of a power source for a transmission.

A further purpose is to employ a gear ratio which becomes so high at a certain portion of the cycle that it cannot be reversed.

A further purpose is to eliminate the need for protecting a high efficiency transmission by means of a brake.

A further purpose is to permit the use of a relatively small driving motor on an irreversible transmission.

Further purposes appear in the specification and in the claims:

In the drawings I have chosen to illustrate a few only of the numerous embodiments in which the invention may appear, selecting the forms shown from the standpoints of convenience in illustration, satisfactory operation and clear demonstration of the principles involved.

FIGURE 7 is a fragmentary section of a modified form of the invention in a position corresponding to the line 3—3 on FIGURE 1.

FIGURE 8 is a fragmentary top plan view of the device of FIGURE 7 omitting the circular spline.

Figure 1:
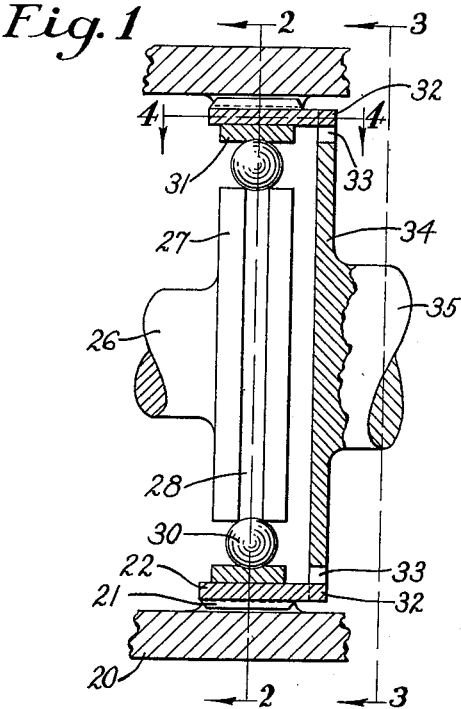
FIGURE 1 is an axial section of a motion transmitting device according to the invention.
Figure 2:
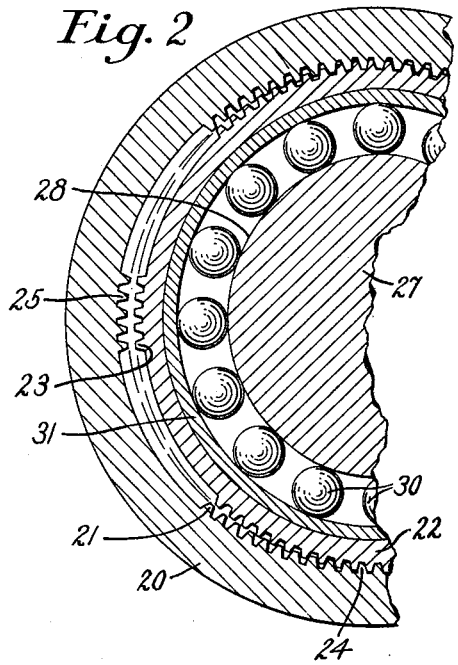
FIGURE 2 is a section of FIGURE 1 on the line 2—2.
Figure 3:
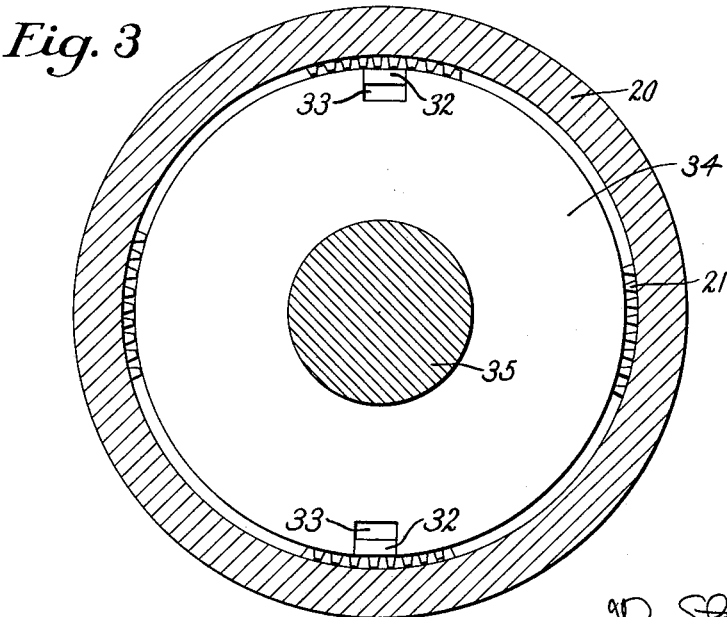
FIGURE 3 is a section of the device of FIGURE 1 on the line 3—3.
Figure 4:
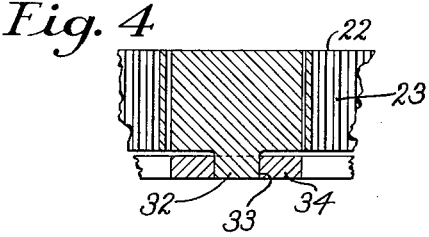
FIGURE 4 is a section of the device of FIGURE 1 on the line 4—4.
Figure 5:
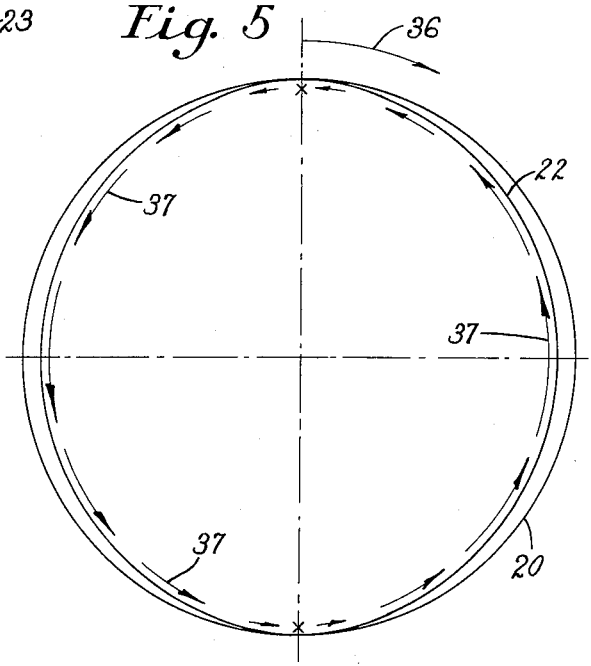
FIGURE 5 is a diagram useful for explaining a portion of the mechanism of FIGURES 1 to 4.

Describing in illustration but not in limitation and referring to the drawings:

In the prior art it has frequently been desirable to produce gear reduction systems which will not "backdrive." An example of this is a hoist, where it is very important for safety reasons to retain the mass which has been hoisted in position in which it may be at the moment, even if the power fails.

There are several different ways in which this function has been performed in the prior art. One of these is the incorporation of a "fail safe" braking mechanism which is automatically applied when the current of the driving motor is interrupted. Another prior art mechanism employs a gear reduction system which has an efficiency which is so low that it cannot be driven from the output end. In both of these, however, there is a serious difficulty. It is frequently desired to lower a weight. If the gear reduction system is capable of acting as a speed increaser, it will tend to drive the motor, and in order to control the rate of descent, the motor must function as a brake. This is possible if an A.C. induction motor is used, but is not readily accomplished where a D.C. motor is employed. Where great weights and sizes are involved, it is preferable to use a D.C. motor. Accordingly, it is necessary to incorporate a brake mechanism which functions through the entire descent. Brakes of the character in question, however, frequently chatter badly and overheat excessively.

In those cases where the speed reduction system has an efficiency so low that it cannot be driven backwards, there has also been difficulty with excessive chatter. As the mass is being lowered, it often sets up a wave of a fundamental frequency which tends to lock the input drive intermittently and thus puts intermittent overloads on the entire system. Furthermore, due to the low efficiency of the reduction system, it is necessary to have a considerably larger motor in order to operate the hoist when the mass is being raised.

When efforts were made originally to employ strain wave gearing or harmonic drive according to my United States Patent 2,906,143, granted September 29, 1959, for Strain Wave Gearing, it became apparent that the efficiency is so high that a brake is required to control the hoisted mass while it is at rest and while it is being lowered. In this respect the problem was similar to that encountered with high efficiency planetary gears and spur gears.

The present invention overcomes the difficulty by making it possible to use harmonic drive or strain wave gearing which is completely self-locking.

According to the present invention sinusoidal angular motion is introduced into the output.

In the input, rotation occurs at constant angular velocity, but the output nevertheless rotates at an angular velocity which varies sinusoidally. This variation of the output is between zero angular velocity and maximum angular velocity. There is thus a constant change in gear ratio between a gear ratio which is infinite-to-one, and a gear ratio which is finite to one. Thus, if the finite gear ratio is 50:1, the variation is between 50:1 and infinite-to-one. It is therefore obvious that the unit can only be driven backwards until it reaches that portion of the rotation at which the gear ratio is infinite-to-one, and at the infinite-to-one portion the gearing is completely self-locking.

It is therefore merely necessary to employ a relatively small brake on the motor to prevent the inertia of the motor from carrying the device past the infinite-to-one position, to the 50:1 position.

In the infinite-to-one gear ratio, angular rotation of the input produces no angular rotation of the output. This would apparently result from a state of physical disconnection between the input and output but it will be evident that the components of the transmission are never physically separated.

The sinusoidal variation of the output is readily accomplished.

Considering first the form of FIGURES 1 to 6 inclusive, I there illustrate a suitable stationary relatively rigid circular spline 20 having internal teeth 21 extending around the circular inner surface. The circular spline 20 is suitably connected to a housing not shown, or constitutes the housing.

Telescoping coaxially within the circular spline 20 is a flexspline 22 having exterior teeth 23 extending around its circumference, the external teeth on the flexspline being of the same circular pitch and the same tooth form as the internal teeth on the circular spline 20, so that the teeth on the respective sets can cooperate or interengage as later explained.

The circular spline will suitably be made of a gear material such as steel, stainless steel or bronze and the flexspline which will also be suitably made of gear material such as steel, stainless steel or bronze.

A wave generator or strain inducer is provided having spaced lobes which deflect the flexspline so that its teeth contact the teeth of the circular spline at the major axis 24 and are out of mesh and also out of contact at the minor axis at 25.

The difference between the number of teeth on the flexspline 22 and the number of internal teeth on the circular spline 20 will be equal to the number of lobes, or a multiple thereof, on the wave generator.

The wave generator is preferably an antifriction bearing type as shown, consisting of a shaft 26 which is coaxial with the circular spline and also coaxial with the flexspline, and suitably constitutes the input. The shaft 26 carries a wave generator cam element 27 located within the flexspline and having an outer bearing race 28 whose contour is elliptoidal in that it embodies two sine wave lengths superimposed on a circle concentric with the axis. The elliptoidal race 28 receives antifriction bearing elements, here shown as balls 30, which ride around the race 28 as in a ballbearing, and engage at the outside an elliptoidal flexible race 31 which itself engages the inside of the flexspline all around the circumference.

Thus by rotating the wave generator on the common axis, an elliptoid can be rotated and the elliptoidal wave travels around the flexspline, moving the points of gear contact and the intermediate points at which the gear teeth are out of mesh and out of contact.

The above insofar as it relates to the general principles of harmonic drive or strain wave gearing is embodied in my Patent 2,946,143 above referred to, to which reference is made for further explanation of the principles.

In accordance with the present invention the flexspline only communicates with the output at two diametrally opposed radially variable positions which in the form of FIGURES 1 to 6 inclusive is accomplished by axially extending lugs 32 on the flexspline which mesh in radially extending slots 33 on a disc 34 which is mounted on output shaft 35 which is coaxial with the input, the circular spline and the flexspline.

Both the input and output shaft turn on bearings not shown, but the wave generator provides an effective bearing for the input shaft and a separate bearing should be provided for the output shaft.

Thus it is seen that the flexspline is in effect angularly keyed by the protruding lugs to the output shaft only at two points 180 degrees opposed.

When the wave shape is rotated, it causes angular displacement of the points of the periphery of the flexspline as explained in my application, Serial No. 779,320, filed December 10, 1958 for Spline and Rotary Table, incorporated herein by reference.

Thus as set forth in the application above referred to, when the elliptoid shape is rotated and the periphery of the shape is not rotated, points on the periphery of the shape angularly move in relation to each other. As shown best in FIGURE 5, as the major axis of the shape is rotated clockwise, as indicated by arrow 36, the various points on the elliptoidal periphery rotate various amounts in a counterclockwise direction, as suggested by the various lengths of arrows 37. It will of course be evident that the variation in lengths of the arrows 37 is exaggerated for the purpose of illustration.

Thus it can be seen that as the input shaft 26 to the wave generator is rotated, it causes the elliptoidal shape of the inner race 28 to rotate and by so rotating, the balls 30 cause the elliptoidal shape of the outer race 31 and of the flexspline 22 to rotate.

It should be noted that it is stated that the shape rotates because of course the flexspline 22 and race 31 do not turn at the same rate as the wave generator cam element.

The lobes of the wave generator cause the teeth of the flexspline 22 to be in full mesh and in contact at the major axis 24 as previously mentioned, and the teeth of the flexspline at the minor axis 25 clear because they are out of mesh.

Accordingly, the flexspline 22 is effectively locked against angular movement at the major axis because its teeth are in full spline engagement.

At the minor axis however, when the elliptoidal shape is rotated, there is considerable angular motion of the teeth of the flexspline 22 as already suggested by the arrows 37.

Thus it will be seen that when the protruding lugs 32 on the flexspline 22 are at the major axis of the elliptoid there is no angular movement whatever of the output shaft and the gear ratio between the input and the output is infinite.

As the wave generator rotates so that the interconnecting lugs 32 are at the minor axis of the elliptoid, the angular velocity of the output is at its maximum, and may for example be corresponding to a gear ratio of input to output of 50:1.

Between the positions of the major axis and the minor axis, the angular motion of the flexspline 22 varies from zero to the major axis to a maximum at the minor axis, following a sinusoidal curve.

Figure 6:
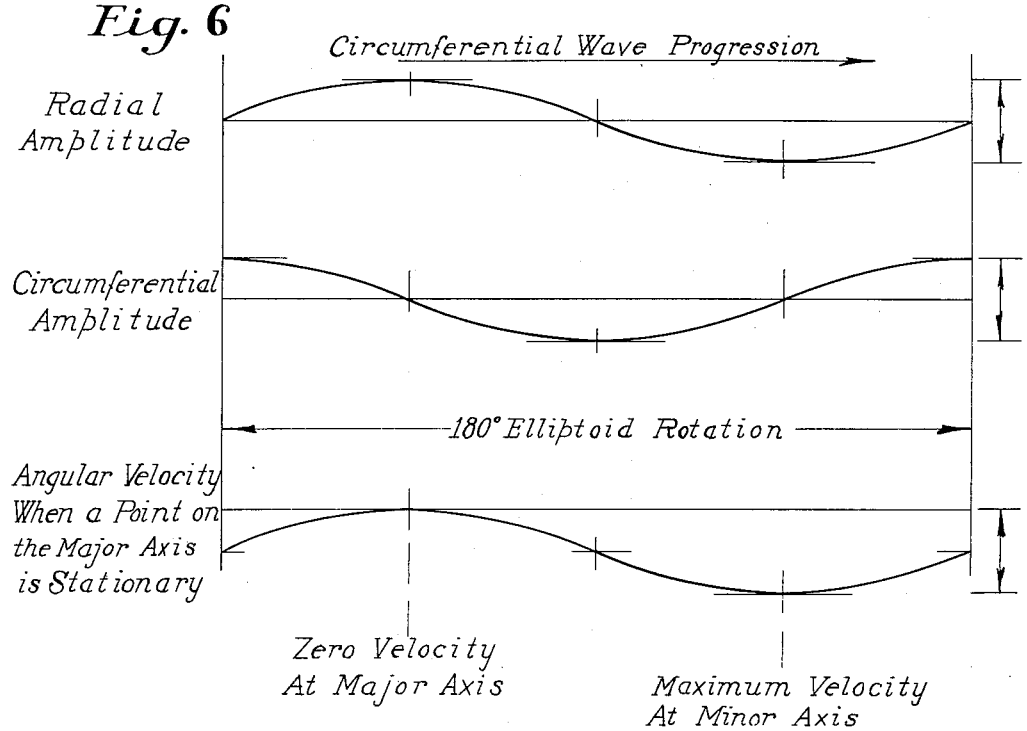
FIGURE 6 is a set of curves which illustrate graphically the principles of the invention.

Referring now to FIGURE 6, it will be seen that as a transverse wave of radial amplitude is circumferentially advanced, as illustrated in the upper curve, it causes longitudinal variations in point location on the wave which are equivalent to circumferential displacement of points on the periphery. Thus, though a transverse wave of radial amplitude is generated with circumferential progression, it automatically produces a longitudinal wave of circumferential amplitude and circumferential progression as shown in the second curve of FIGURE 6. By analysis of the two waves referred to, it will be evident that the angular velocity of a point on the elliptoidal periphery will vary sinusoidally in relation to its position with respect to the major axis as shown in the lowermost curve of FIGURE 6. In this curve the angular velocity at the major axis is shown to be zero and at the minor axis it is a maximum. By coupling the elliptoidal flexspline to the output at only two diametrally opposite points, the desired change in gear ratio is obtained. This causes a rotational tremor in the output shaft which is easily absorbed in the flexspline, in the hoist parts and the cables of the hoist. The length and time duration of the tremor is exceedingly small, so that it presents no problem. The ratio of the gearing varies from maximum to minimum and back to maximum in one-half revolution of the wave generator. Hence, at 2000 revolutions per minute input, there are 4000 changes of ratio from maximum to minimum and back to maximum per minute.

Figure 7:
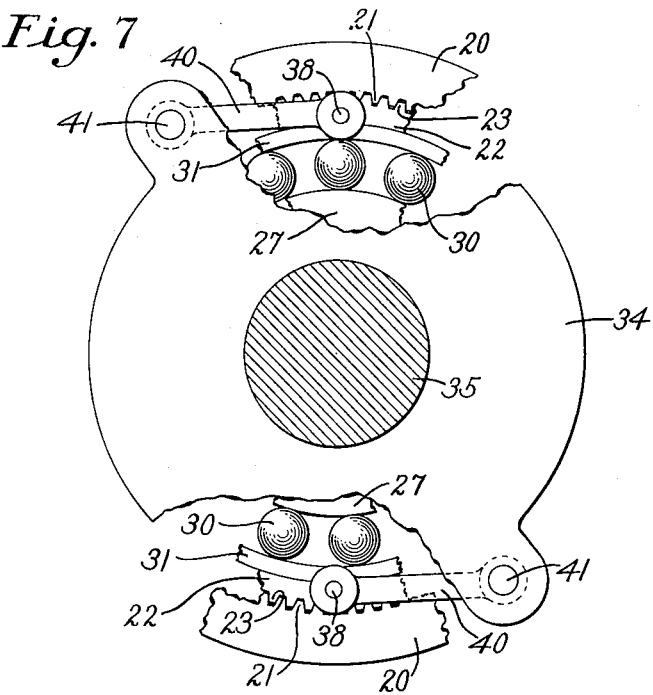
FIGURES 7 and 8 illustrate a variation.
Figure 8:
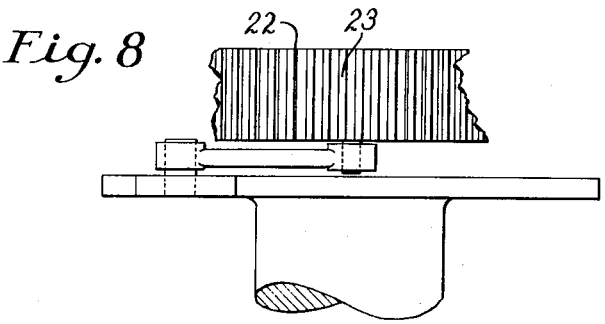

It will of course be evident that the lugs 32 on the flexspline slide radially in and out as power is transferred. It is therefore desirable to employ antifriction material and lubrication so as to avoid undue wear. A convenient way to accomplish the connection with reduced wear is shown in FIGURES 7 and 8, which are merely illustrative of various devices which may be employed. In this mechanism pivot pins 38 extend parallel to the axis at diametrally opposed positions on the flexspline 22 and these pivotally connect to one end of each connecting rod 40. The connecting rods 40 are of equal length and extend circumferentially in the same circumferential direction (in this case counterclockwise) and pivotally connect to pins 41 at the corresponding radial positions and at diametrally opposed positions on disc 34' mounted on output shaft 35. It will be evident of course that the form of FIGURES 7 and 8 modifies the sinusoidal wave to a slight degree without departing from the principles of the invention.

The exact shape of the sinusoidal wave is of course a function of the wave generator.

It will be evident that the efficiency is relatively high, since during most of the power transmission cycle the device is operating as a standard harmonic drive or strain wave gear mechanism. However, at the position at which the infinite-to-one gear ratio applies, the efficiency is zero. At these points, however, it takes very little power to rotate the wave generator. The transmission therefore has higher overall efficiency than units which require the incorporation of a large brake. It is thus possible to operate with a relatively small motor for accomplishing the same hoisting capacity.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a device for transmitting motion, a relatively rigid circular spline having teeth, a flexspline of different pitch diameter from the rigid spline, the flexspline having cooperating teeth of the same circular pitch as the rigid spline, coaxial with the rigid spline and having a deflectable wall, a wave generator operative to deflect the flexspline and to maintain the flexspline deflected in such manner that its teeth are engaged with the teeth of the rigid spline in two diametrically opposed positions interspaced by positions at which the teeth are not in mesh, means for rotating the wave generator on the axis, a shaft turnable about the common axis and a radially variable interconnection between the flexspline and the shaft at a constant two diametrically opposed positions only.

2. A device of claim 1, in which the radially variable interconnection comprises a lug engaging in a radial groove.

3. A device of claim 1, in which the radially variable interconnection comprises a connecting rod pivoted to the flexspline and pivoted to the shaft.

4. A device of claim 1 in which the wave generator is internal, the rigid spline is external and the flexspline is between the wave generator and the rigid spline.

5. A device of claim 1, in which the output is sinusoidal.

6. In a device for transmitting motion, a circular spline having internal teeth, a coaxial flexspline within the circular spline having external teeth which cooperate with the internal teeth on the circular spline, the flexspline being deflectable radially, a wave generator within the flexspline and acting outwardly against the flexspline to maintain the flexspline deflected so that its teeth are interengaged with the teeth of the circular spline at two diametrically opposed positions interspaced by positions at which the teeth are not in mesh, input means for turning the wave generator about the common axis, output means turning about the common axis, and means interconnecting the flexspline at a constant two diametrically opposed positions only with the output means, while permitting the flexspline to deflect radially, the gear ratio varying between limits of infinite-to-one and finite-to-one.

7. A device of claim 6, in which the output is sinusoidal.

References Cited in the file of this patent

UNITED STATES PATENTS 2,906,143　　Musser ＿＿＿＿＿＿＿＿＿＿＿＿＿ Sept. 29, 1959